United States Patent
Ichikawa et al.

(10) Patent No.: US 11,022,190 B2
(45) Date of Patent: Jun. 1, 2021

(54) VEHICLE CONTROL DEVICE AND VEHICLE CONTROL METHOD

(71) Applicants: JATCO Ltd, Fuji (JP); NISSAN MOTOR CO., LTD., Yokohama (JP)

(72) Inventors: Keisuke Ichikawa, Atsugi (JP); Tomoaki Kabe, Nagoya (JP); Kosuke Abe, Gwangmyeong-si (KR)

(73) Assignees: JATCO LTD, Fuji (JP); NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 16/626,366

(22) PCT Filed: Jun. 26, 2018

(86) PCT No.: PCT/JP2018/024111
§ 371 (c)(1),
(2) Date: Dec. 24, 2019

(87) PCT Pub. No.: WO2019/004166
PCT Pub. Date: Jan. 3, 2019

(65) Prior Publication Data
US 2020/0116218 A1    Apr. 16, 2020

(30) Foreign Application Priority Data

Jun. 28, 2017 (JP) .............................. JP2017-126471

(51) Int. Cl.
*F16H 45/02* (2006.01)
*F16D 48/06* (2006.01)
(Continued)

(52) U.S. Cl.
CPC ............. *F16D 48/066* (2013.01); *F16H 9/18* (2013.01); *F16H 45/02* (2013.01); *F16H 61/143* (2013.01);
(Continued)

(58) Field of Classification Search
CPC ........... F16D 48/066; F16D 2500/1026; F16D 2500/3024; F16D 2500/10412;
(Continued)

(56) References Cited

U.S. PATENT DOCUMENTS 10,682,910 B2 * 6/2020 Washio .............. B60K 23/0808
2016/0305522 A1 * 10/2016 Fukao ................... F16H 37/022
2018/0080547 A1 * 3/2018 Hamano ................. F16H 61/12

FOREIGN PATENT DOCUMENTS

JP    2012-149675 A    8/2012

* cited by examiner

*Primary Examiner* — David J Hlavka
(74) *Attorney, Agent, or Firm* — Foley & Lardner LLP

(57) ABSTRACT

A vehicle control device for a vehicle with a drive source and an automatic transmission including a friction engaging element for transmitting a driving force of the drive source to drive wheels by being engaged by a hydraulic pressure, wherein the vehicle control device is configured to perform an abnormality diagnosis of a solenoid valve for adjusting a hydraulic pressure to be supplied to the friction engaging element on the basis of a slip amount of the friction engaging element, and prohibit the abnormality diagnosis of the solenoid valve if a hydraulic pressure upstream of the solenoid valve is below a predetermined hydraulic pressure at which the friction engaging element is engaged, the hydraulic pressure upstream of the solenoid being a source hydraulic pressure to be adjusted by the solenoid valve.

6 Claims, 4 Drawing Sheets

(51) Int. Cl.
*F16H 9/18* (2006.01)
*F16H 61/14* (2006.01)

(52) U.S. Cl.
CPC ................ *F16D 2500/1026* (2013.01); *F16D 2500/3024* (2013.01); *F16H 2061/145* (2013.01)

(58) Field of Classification Search
CPC ... F16D 2500/30406; F16D 2500/5108; F16H 9/18; F16H 45/02; F16H 61/143; F16H 2061/145; F16H 37/022; F16H 2037/026; F16H 2059/683; F16H 61/662; F16H 2061/1268; F16H 61/12
See application file for complete search history.

VEHICLE CONTROL DEVICE AND VEHICLE CONTROL METHOD

TECHNICAL FIELD

The present invention relates to a vehicle control device and a vehicle control method.

BACKGROUND ART

JP2012-149675A discloses a technique for diagnosing an abnormality of a solenoid valve for adjusting a hydraulic pressure to be supplied to a friction engaging element on the basis of a slip amount of the friction engaging element of an automatic transmission.

SUMMARY OF INVENTION

However, if a hydraulic pressure upstream of the solenoid valve, i.e. a source hydraulic pressure to be adjusted by the solenoid valve is below a hydraulic pressure at which the friction engaging element is engaged, there is a possibility that the friction engaging element slips even if the solenoid valve is normally operating. In this case, with the technique disclosed in patent literature 1, an abnormality may be erroneously determined although the solenoid valve has no abnormality.

The present invention was developed in view of such a problem and aims to prevent an abnormality from being erroneously determined although a solenoid valve for adjusting a hydraulic pressure to be supplied to a friction engaging element has no abnormality.

According to one aspect of the present invention, a vehicle control device for a vehicle with a drive source and an automatic transmission including a friction engaging element for transmitting a driving force of the drive source to drive wheels by being engaged by a hydraulic pressure, comprising diagnosis means for performing an abnormality diagnosis of a solenoid valve for adjusting a hydraulic pressure to be supplied to the friction engaging element on the basis of a slip amount of the friction engaging element, and prohibition means for prohibiting the abnormality diagnosis of the solenoid valve by the diagnosis means if a hydraulic pressure upstream of the solenoid valve is below a predetermined hydraulic pressure at which the friction engaging element is engaged.

According to another aspect of the present invention, a vehicle control method for a vehicle with a drive source and an automatic transmission including a friction engaging element for transmitting a driving force of the drive source to drive wheels by being engaged by a hydraulic pressure, comprising performing an abnormality diagnosis of a solenoid valve for adjusting a hydraulic pressure to be supplied to the friction engaging element on the basis of a slip amount of the friction engaging element, and prohibiting the abnormality diagnosis of the solenoid valve if a hydraulic pressure upstream of the solenoid valve is below a predetermined hydraulic pressure at which the friction engaging element is engaged.

According to these aspects, if the hydraulic pressure upstream of the solenoid valve is below the predetermined hydraulic pressure at which the friction engaging element is engaged, the abnormality diagnosis of the solenoid valve is prohibited. If the hydraulic pressure upstream of the solenoid valve is below the predetermined hydraulic pressure, there is a possibility that the solenoid valve has no abnormality, but another abnormality in which the hydraulic pressure upstream of the solenoid valve cannot be secured even if the friction engaging element slips. Thus, in such a case, it can be prevented that an abnormality is erroneously determined although the solenoid valve has no abnormality by prohibiting the abnormality diagnosis of the solenoid valve.

DESCRIPTION OF EMBODIMENT

Hereinafter, a vehicle 100 according to an embodiment of the present invention is described with reference to the accompanying drawings.

Figure 1:
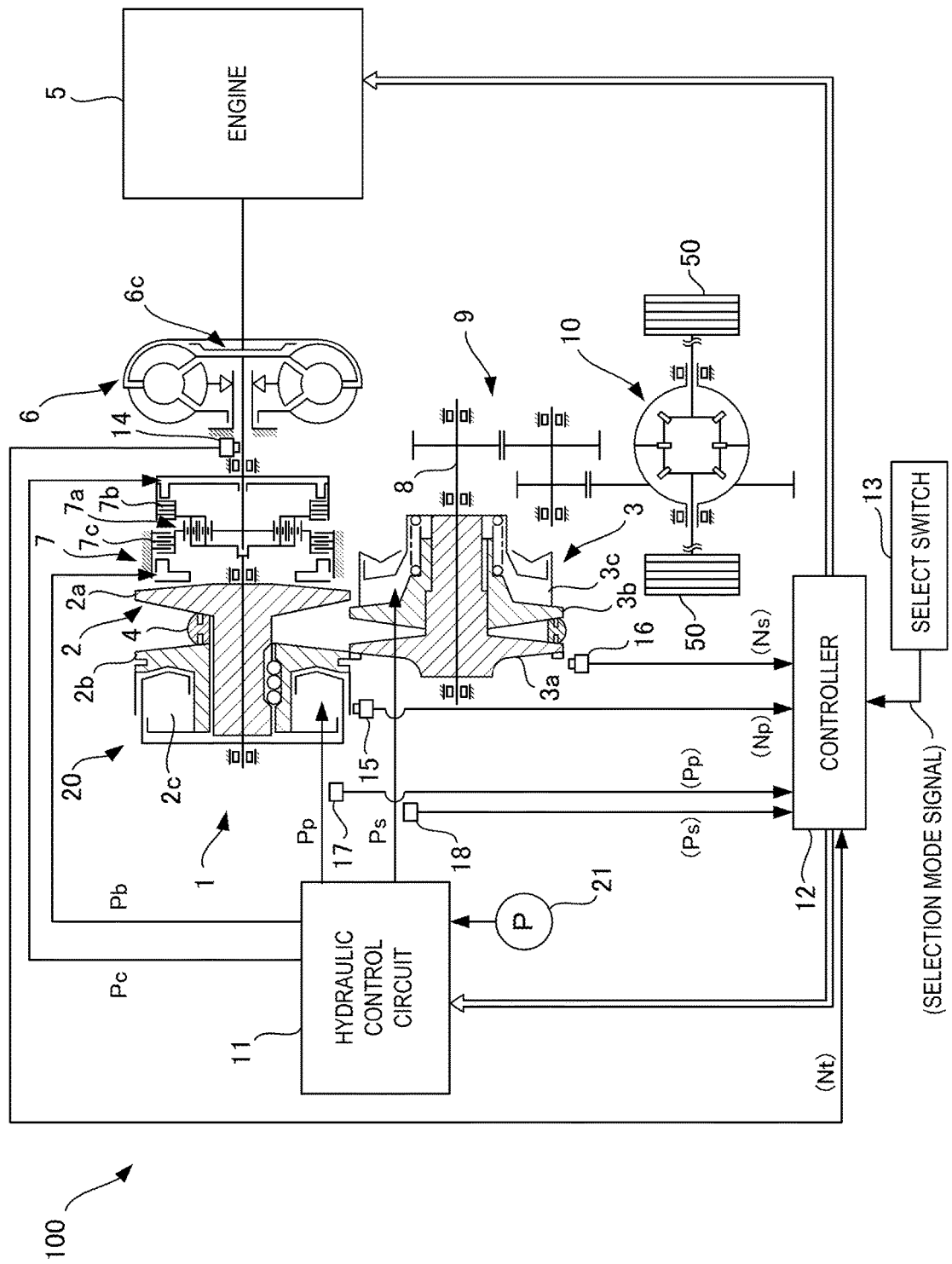
FIG. 1 is a schematic configuration diagram of a vehicle according to an embodiment of the present invention.

FIG. 1 is a schematic configuration diagram of the vehicle 100. As shown in FIG. 1, the vehicle 100 includes an engine (drive source) 5, an automatic transmission 1 for shifting and transmitting the rotation of the engine 5 to drive wheels 50 and a torque converter 6 provided between the engine 5 and the automatic transmission 1. The torque converter 6 includes a lock-up clutch 6c.

The automatic transmission 1 includes a continuously variable transmission mechanism 20 and a forward/reverse switching mechanism 7.

The continuously variable transmission mechanism 20 includes a primary pulley 2 and a secondary pulley 3 disposed such that V-shaped grooves are aligned, and a belt 4 mounted in the V-shaped grooves of the pulleys 2, 3.

The engine 5 is arranged coaxially with the primary pulley 2, and the torque converter 6 and the forward/reverse switching mechanism 7 are successively provided from the side of the engine 5 between the engine 5 and the primary pulley 2.

The forward/reverse switching mechanism 7 includes a double-pinion planetary gear set 7a as a main constituent element, a sun gear thereof is coupled to the engine 5 via the torque converter 6 and a carrier thereof is coupled to the primary pulley 2. The forward/reverse switching mechanism 7 further includes a forward clutch 7b serving as a friction engaging element for directly coupling the sun gear and the carrier of the double-pinion planetary gear set 7a and a reverse brake 7c serving as a friction engaging element for fixing a ring gear. Input rotation transmitted from the engine 5 by way of the torque converter 6 is directly transmitted to the primary pulley 2 when the forward clutch 7b is engaged, and the input rotation transmitted from the engine 5 by way of the torque converter 6 is reversed and transmitted to the primary pulley 2 when the reverse brake 7c is engaged.

The forward clutch 7b is engaged by having a clutch pressure Pc supplied thereto from a hydraulic control circuit 11 when a forward travel mode is selected by a select switch 13, and the reverse brake 7c is engaged by having a brake pressure Pb supplied thereto from the hydraulic control circuit 11 when a reverse travel mode is selected.

The rotation of the primary pulley 2 is transmitted to the secondary pulley 3 via the belt 4, and the rotation of the secondary pulley 3 is transmitted to the drive wheels 50 by way of an output shaft 8, a gear set 9 and a differential gear device 10.

To enable a change of a speed ratio between the primary pulley 2 and the secondary pulley 3 during the above power transmission, one of conical plates forming the V-shaped groove of each of the primary pulley 2 and the secondary pulley 3 is a fixed conical plate 2a, 3a and the other is a movable conical plate 2b, 3b displaceable in an axial direction.

These movable conical plates 2b, 3b are biased toward the fixed conical plates 2a, 3a by supplying a primary pulley pressure Pp and a secondary pulley pressure Ps to a primary pulley chamber 2c and a secondary pulley chamber 3c, whereby the belt 4 is frictionally engaged with the conical plates to transmit power between the primary pulley 2 and the secondary pulley 3.

In shifting, widths of the V-shaped grooves of the both pulleys 2, 3 are changed by a differential pressure between the primary pulley pressure Pp and the secondary pulley pressure Ps generated to correspond to a target speed ratio, and the target speed ratio is realized by continuously changing winding arc diameters of the belt 4 on the pulleys 2, 3.

The primary pulley pressure Pp, the secondary pulley pressure Ps, the clutch pressure Pc and the brake pressure Pb are controlled by the hydraulic control circuit 11 on the basis of a control signal from a controller (control device, diagnosis means, prohibition means) 12.

The hydraulic control circuit 11 includes a plurality of oil passages and a plurality of solenoid valves. The hydraulic control circuit 11 switches a hydraulic pressure supply path on the basis of a control signal from the controller 12, generates a necessary hydraulic pressure by adjusting a pressure of hydraulic oil supplied from an oil pump 21, and supplies the generated hydraulic pressure to the torque converter 6 and each part of the automatic transmission 1. The oil pump 21 of the present embodiment is driven, using part of the power of the engine 5. The oil pump 21 may be an electric oil pump.

Figure 2:
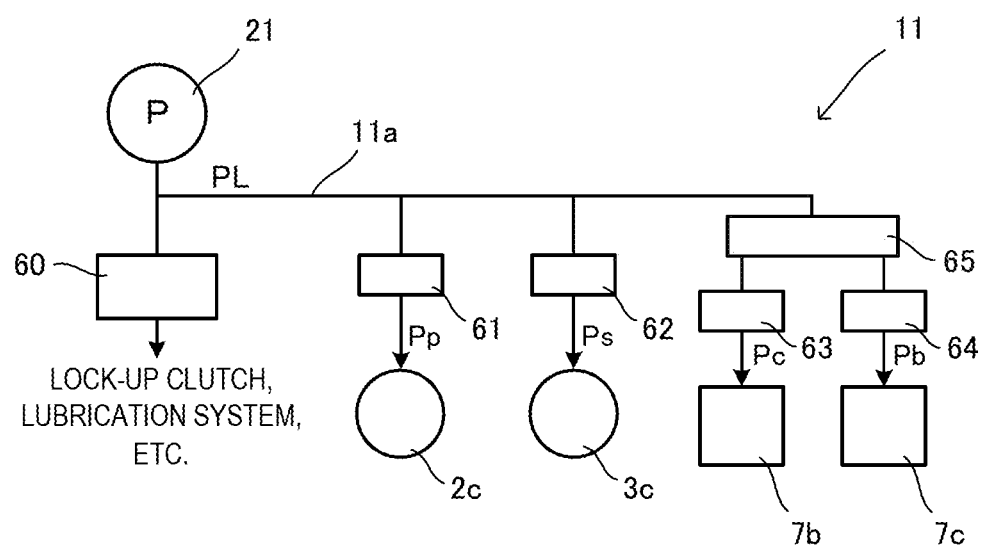
FIG. 2 is a diagram showing an essential part of a hydraulic control circuit.

FIG. 2 is a diagram showing essential parts of the hydraulic control circuit 11.

As shown in FIG. 2, the oil pump 21 is connected to a line pressure oil passage 11a of the hydraulic control circuit 11, and the hydraulic oil is supplied from the oil pump 21.

Further, a regulator valve 60 is provided in the line pressure oil passage 11a. The regulation valve 60 regulates the pressure of the hydraulic oil supplied from the oil pump 21 and generates a line pressure PL. The hydraulic oil discharged to a side downstream of the regulation valve 60 is supplied to the lock-up clutch 6c, a lubrication system, etc.

The primary pulley pressure Pp adjusted by a solenoid valve 61 using the line pressure PL as a source pressure is supplied to the primary pulley chamber 2c. The secondary pulley pressure Ps adjusted by a solenoid valve 62 is supplied to the secondary pulley chamber 3c.

Further, the clutch pressure Pc adjusted by a solenoid valve 63 using the line pressure PL as a source pressure is supplied to the forward clutch 7b. The brake pressure Pb adjusted by a solenoid valve 64 using the line pressure PL as a source pressure is supplied to the reverse brake 7c.

Further, a switching valve 65 which operates according to a selection mode selected by the select switch 13 is provided upstream of the solenoid valves 63, 64. The switching valve 65 supplies the hydraulic oil to the solenoid valve 63 and the forward clutch 7b when the forward travel mode is selected, and supplies the hydraulic oil to the solenoid valve 64 and the reverse brake 7c when the reverse travel mode is selected.

The controller 12 is configured to include a CPU, a ROM, a RAM, an input/output interface, a bus connecting these and the like, and integrally controls a rotation speed and a torque of the engine 5, an engaged state of the lock-up clutch 6c, a speed ratio of the continuously variable transmission mechanism 20, engaged states of the forward clutch 7b and the reverse brake 7c and the like on the basis of signals from various sensors for detecting a state of each part of the vehicle 100.

To the controller 12 are input a selection mode signal from the select switch 13 for selecting an operation mode of the automatic transmission 1, a signal from a turbine rotation sensor 14 for detecting a rotation speed Nt of an output shaft of the torque converter 6, a signal from a primary pulley rotation sensor 15 for detecting a rotation speed Np of the primary pulley 2, a signal from a secondary pulley rotation sensor 16 for detecting a rotation speed Ns of the secondary pulley 3, a signal from a primary pulley pressure sensor 17 for detecting the primary pulley pressure Pp, a signal from a secondary pulley pressure sensor 18 for detecting the secondary pulley pressure Ps, a signal from an accelerator pedal opening sensor (not shown) for detecting an operated state of an accelerator pedal (not shown), a signal from a brake switch (not shown) for detecting an operated state of a brake pedal (not shown) and the like.

Further, the controller 12 of the present embodiment performs each abnormality diagnosis on the basis of the signals from each of the above sensors, and executes a control corresponding to a diagnostic content if the occurrence of an abnormality has been determined.

For example, the controller 12 performs an abnormality diagnosis of the solenoid valve 63 for adjusting the clutch pressure Pc to be supplied to the forward clutch 7b on the basis of a slip amount of the forward clutch 7b, and performs an abnormality diagnosis of the solenoid valve 64 for adjusting the brake pressure Pb to be supplied to the reverse brake 7c on the basis of a slip amount of the reverse brake 7c.

Here, if the hydraulic pressure upstream of the solenoid valves 63, 64, i.e. the line pressure PL, which is a source hydraulic pressure to be adjusted by the solenoid valves 63, 64, is below a predetermined hydraulic pressure at which the forward clutch 7b and the reverse brake 7c are engaged, there is a possibility that the forward clutch 7b and the reverse brake 7c slip even if the solenoid valves 63, 64 are normally operating.

Accordingly, if the abnormality diagnoses of the solenoid valves 63, 64 are merely performed only on the basis of the slip amounts of the forward clutch 7b and the reverse brake 7c, an abnormality may be erroneously determined although the solenoid valves 63, 64 have no abnormality.

Figure 3:
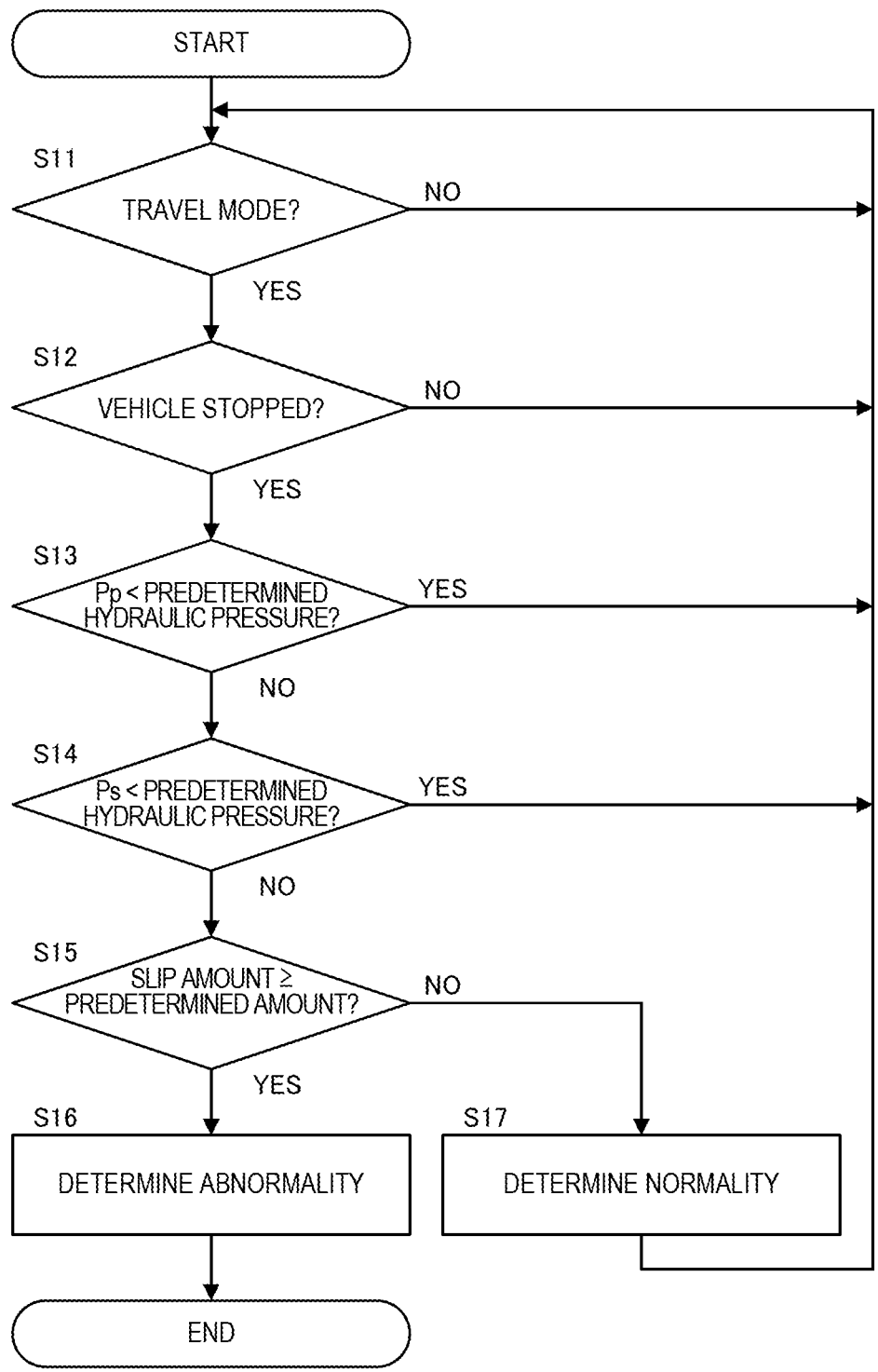
FIG. 3 is a flow chart showing an abnormality diagnosis process.

Thus, the controller 12 of the present embodiment performs an abnormality diagnosis process for the solenoid valves 63, 64 in accordance with the procedure of a flow chart shown in FIG. 3 to prevent such erroneous determination.

The abnormality diagnosis process performed by the controller 12 is described below with reference to FIG. 3.

In Step S11, the controller 12 determines whether either one of the forward travel mode and the reverse travel mode has been selected by the select switch 13.

The controller 12 proceeds the process to Step S12 if the selection of the travel mode is determined on the basis of a selection mode signal from the select switch 13. Further, the processing of Step S11 is repeated without the performing the subsequent abnormality diagnosis process if the selection of the travel mode is not determined.

As described above, if the travel mode is not selected, neither the forward clutch 7b nor the reverse brake 7c is engaged. Thus, in this case, the abnormality diagnoses of the solenoid valves 63, 64 are prohibited.

In Step S12, the controller 12 determines whether or not the vehicle 100 is stopped.

Whether or not the vehicle 100 is stopped can be determined, for example, if a vehicle speed is equal to or lower than a predetermined speed.

The controller 12 proceeds the process to Step S13 if it is determined that the vehicle 100 is stopped. Further, the processings from Step S11 are repeated without performing the subsequent abnormality diagnosis process if it is determined that the vehicle 100 is not stopped.

The abnormalities of the solenoid valve 63, 64, which may cause slips of the forward clutch 7b and the reverse brake 7c, are so-called functional abnormalities and are assumed to occur when the travel mode is selected and the solenoid valve 63, 64 is operated. That is, it is assumed that these abnormalities are abnormalities occurring when the vehicle 100 enters a state where the vehicle 100 can travel from a state where the vehicle 100 is not traveling. Thus, the controller 12 prohibits any abnormality diagnosis during the travel of the vehicle, thereby preventing erroneous determination due to excessive diagnoses.

In Step S13, the controller 12 determines whether or not the primary pulley pressure Pp is below a predetermined hydraulic pressure.

The predetermined hydraulic pressure is a hydraulic pressure at which the forward clutch 7b is engaged if this hydraulic pressure is supplied to the forward clutch 7b when the forward travel mode is selected as the travel mode. Further, when the reverse travel mode is selected as the travel mode, the predetermined hydraulic pressure is a hydraulic pressure at which the reverse brake 7c is engaged if this hydraulic pressure is supplied to the reverse brake 7c. The predetermined hydraulic pressure is, for example, 0.2 MPa to 0.3 MPa.

The controller 12 repeats the processings from Step S11 without performing the subsequent abnormality diagnosis process if the primary pulley pressure Pp is determined to be below the predetermined hydraulic pressure on the basis of a signal from the primary pulley pressure sensor 17. Further, if the primary pulley pressure Pp is determined to be equal to or higher than the predetermined hydraulic pressure, the controller 12 proceeds the process to Step S14.

In Step S14, the controller 12 determines whether or not the secondary pulley pressure Ps is below the predetermined hydraulic pressure.

The controller 12 repeats the processings from Step S11 without performing the subsequent abnormality diagnosis process if the secondary pulley pressure Ps is determined to be below the predetermined hydraulic pressure on the basis of a signal from the secondary pulley pressure sensor 18. Further, if the secondary pulley pressure Ps is determined to be equal to or higher than the predetermined hydraulic pressure, the controller 12 proceeds the process to Step S15.

If at least one of the primary pulley pressure Pp or the secondary pulley pressure Ps is below the predetermined hydraulic pressure, there is a possibility that the line pressure PL, which is the source pressure of the primary pulley pressure Pp and the secondary pulley pressure Ps, is below the predetermined hydraulic pressure. As shown in FIG. 2, the line pressure PL is the hydraulic pressure upstream of the solenoid valves 63, 64, i.e. the source hydraulic pressure to be adjusted by the solenoid valves 63, 64.

If the line pressure PL is below the predetermined hydraulic pressure, there is a possibility that the forward clutch 7b and the reverse brake 7c slip even if the solenoid valves 63, 64 are normally operating as described above. However, in this case, even if the forward clutch 7b and the reverse brake 7c slip, there is a possibility that the solenoid valves 63, 64 have no abnormality, but another abnormality in which the line pressure PL cannot be secured has occurred.

Accordingly, the controller 12 prohibits the abnormality diagnoses of the solenoid valves 63, 64, assuming that the hydraulic pressure upstream of the solenoid valves 63, 64 is below the predetermined hydraulic pressure, if at least one of the primary pulley pressure Pp or the secondary pulley pressure Ps is below the predetermined hydraulic pressure. This prevents the erroneous determination of an abnormality even though the solenoid valves 63, 64 have no abnormality.

In Step S15, the controller 12 determines whether or not the slip amount of the forward clutch 7b is equal to or more than a predetermined amount if the forward travel mode is selected as the travel mode. Further, if the reverse travel mode is selected, whether or not the slip amount of the reverse brake 7c is equal to or more than the predetermined amount is determined.

The slip amounts of the forward clutch 7b and the reverse brake 7c are, for example, computed on the basis of a signal from the turbine rotation sensor 14 for detecting the rotation speed Nt of the output shaft of the torque converter 6 and a signal from the primary pulley rotation sensor 15 for detecting the rotation speed Np of the primary pulley 2. It should be noted that the predetermined amount is appropriately set in consideration of an error of each sensor and the like. Further, the predetermined amount when the forward travel mode is selected and that when the reverse travel mode is selected may be individually set. Further, the predetermined amount can be changed according to a safety factor in consideration of a slip amount in normal time. On the other hand, since it is not possible to classify whether an abnormality of the slip amount is caused by a solenoid abnormality or an abnormality of the upstream of the hydraulic pressure even if the predetermined amount is changed according to the safety factor, the predetermined amount is a fixed value to simplify a control in the present embodiment.

If the slip amount of the forward clutch 7b or the slip amount of the reverse brake 7c is determined to be equal to or more than the predetermined amount, the controller 12 determines that the solenoid valve 63 or 64 is abnormal (Step S16). Further, if the slip amount of the forward clutch 7b or the slip amount of the reverse brake 7c is determined to be below the predetermined amount, the controller 12 determines that the solenoid valve 63 or 64 is normal (Step S17) and repeats the processings from Step S11.

It should be noted that, if the vehicle 100 does not include the primary pulley pressure sensor 17, the abnormality diagnosis process can be performed with Step S13 omitted. Similarly, if the vehicle 100 does not include the secondary pulley pressure sensor 18, the abnormality diagnosis process can be performed with Step S14 omitted.

As described above, the vehicle 100 includes the engine 5 and the automatic transmission 1 having the forward clutch 7b and the reverse brake 7c for transmitting a driving force of the engine 5 to the drive wheels 50 by being engaged by the hydraulic pressure. The controller 12 performs the abnormality diagnoses of the solenoid valves 63, 64 for adjusting the clutch pressure Pc and the brake pressure Pb to be supplied to the forward clutch 7b and the reverse brake 7c on the basis of the slip amounts of the forward clutch 7b and the reverse brake 7c, and prohibits the abnormality diagnoses of the solenoid valves 63, 64 if the line pressure PL, which is the hydraulic pressure upstream of the solenoid valves 63, 64, is below the predetermined hydraulic pressure at which the forward clutch 7b and the reverse brake 7c are engaged.

More specifically, the automatic transmission 1 includes the continuously variable transmission mechanism 20 having the primary pulley 2 and the secondary pulley 3 whose groove widths are changed by the hydraulic pressure, and the belt 4 mounted on the primary pulley 2 and the secondary pulley 3. The controller 12 prohibits the abnormality diagnoses of the solenoid valves 63, 64 if at least one of the primary pulley pressure Pp to be supplied to the primary pulley 2 or the secondary pulley pressure Ps to be supplied to the secondary pulley 3 is below the predetermined hydraulic pressure.

If the hydraulic pressure (line pressure PL) upstream of the solenoid valves 63, 64 is below the predetermined hydraulic pressure, there is a possibility that the solenoid valves 63, 64 have no abnormality, but another abnormality in which the hydraulic pressure (line pressure PL) upstream of the solenoid valves 63, 64 cannot be secured has occurred even if the forward clutch 7b and the reverse brake 7c slip. Thus, in such a case, it can be prevented that an abnormality is erroneously determined although the solenoid valves 63, 64 have no abnormality by prohibiting the abnormality diagnoses of the solenoid valves 63, 64.

Further, the controller 12 prohibits the abnormality diagnoses of the solenoid valves 63, 64 during the travel of the vehicle 100.

According to this, erroneous determination due to excessive diagnoses can be prevented.

Figure 4:
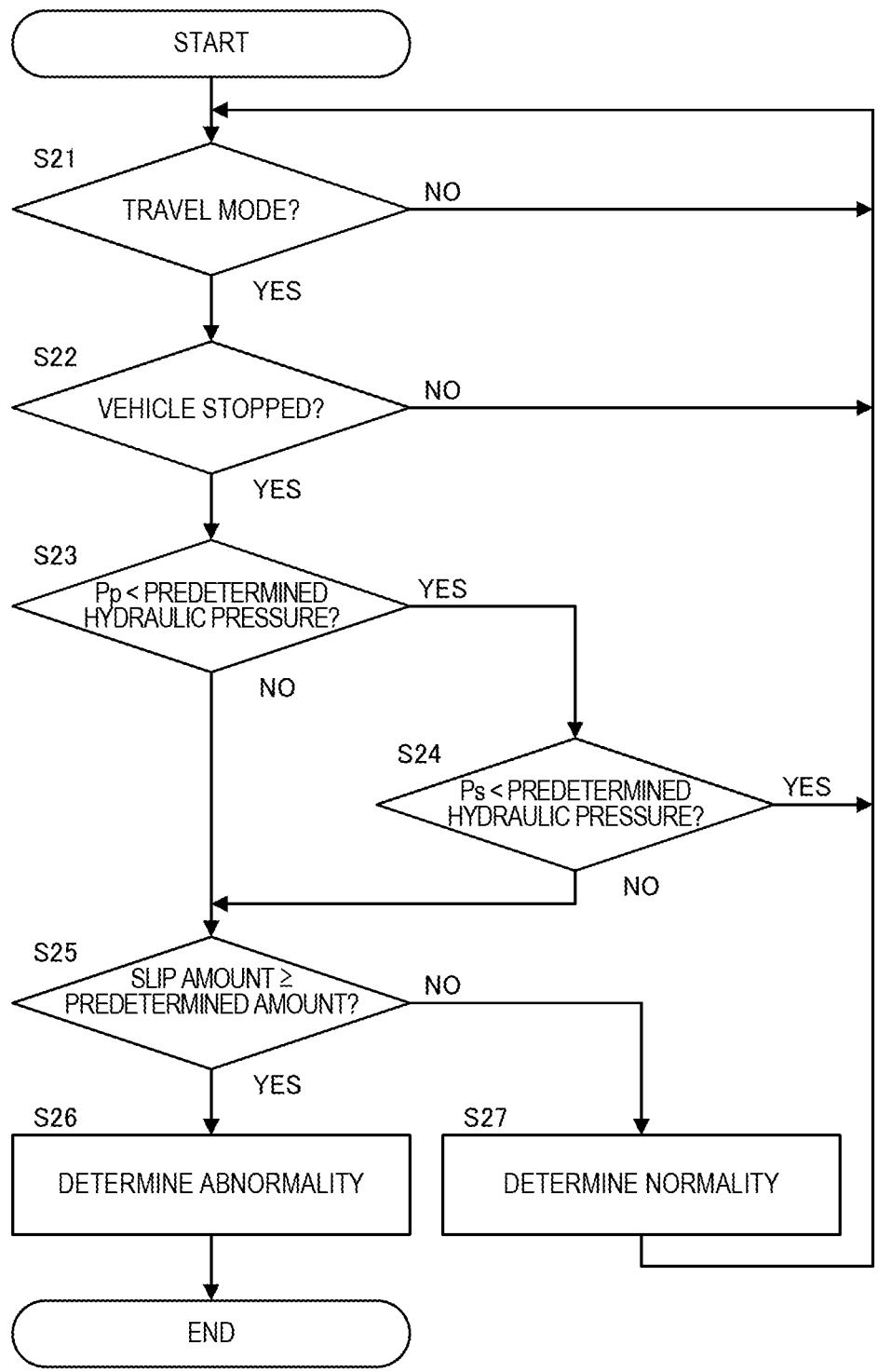
FIG. 4 is a flow chart showing a modification of the abnormality diagnosis process.

It should be noted that although the abnormality diagnoses of the solenoid valves 63, 64 are prohibited if at least one of the primary pulley pressure Pp or the secondary pulley pressure Ps is below the predetermined hydraulic pressure in the abnormality diagnosis process shown in FIG. 3, the abnormality diagnoses of the solenoid valves 63, 64 may be prohibited if both the primary pulley pressure Pp and the secondary pulley pressure Ps are below the predetermined hydraulic pressure as shown as a modification of the abnormality diagnosis process in FIG. 4.

The modification of the abnormality diagnosis process is described with reference to FIG. 4 below. It should be noted that Steps 21, 22 and 25 to 27 of FIG. 4 are not described since these are similar to Steps S11, S12 and S15 to S17 of FIG. 3.

In Step S23, the controller 12 determines whether or not the primary pulley pressure Pp is below the predetermined hydraulic pressure.

If the primary pulley pressure Pp is determined to be below the predetermined hydraulic pressure on the basis of a signal from the primary pulley pressure sensor 17, the controller 12 proceeds the process to Step S24. Further, if the primary pulley pressure Pp is determined to be equal to or higher than the predetermined hydraulic pressure, the controller 12 proceeds the process to Step S25.

In Step S24, the controller 12 determines whether or not the secondary pulley pressure Ps is below the predetermined hydraulic pressure.

If the secondary pulley pressure Ps is determined to be below the predetermined hydraulic pressure on the basis of a signal from the secondary pulley pressure sensor 18, the controller 12 repeats the processings from Step S21 without performing the subsequent abnormality diagnosis process. Further, if the secondary pulley pressure Ps is determined to be equal to or higher than the predetermined hydraulic pressure, the controller 12 proceeds the process to Step S25.

According to this, the abnormality diagnoses of the solenoid valves 63, 64 are prohibited only if the line pressure PL has been confirmed to be below the predetermined hydraulic pressure by two sensors 18, 19. Thus, it can be prevented that the abnormality diagnoses of the solenoid valves 63, 64 is prohibited even though the line pressure PL is actually equal to or higher than the predetermined hydraulic pressure.

Although the embodiment of the present invention has been described above, the above embodiment is merely an illustration of one application example of the present invention and not intended to limit the technical scope of the present invention to the specific configuration of the above embodiment.

For example, the controller 12 integrally controls the engine 5, the automatic transmission 1 and the like in the above embodiment. However, the controller 12 may be constituted by a plurality of controllers.

Further, in the above embodiment, the automatic transmission 1 is a continuously variable automatic transmission provided with the continuously variable transmission mechanism 20. However, the automatic transmission 1 may be a stepped automatic transmission and the present invention may be applied to solenoid valves for respectively adjusting hydraulic pressures to be supplied to a plurality of friction engaging elements provided inside.

Further, the automatic transmission 1 may be provided with a sub-transmission mechanism instead of the forward/reverse switching mechanism 7. In this case, the present invention can be applied to solenoid valves for respectively adjusting hydraulic pressures to be supplied to a plurality of friction engaging elements of the sub-transmission mechanism.

Further, a motor generator may be provided instead of or together with the engine 5 as a drive source of the vehicle 100.

With respect to the above description, the contents of application No. 2017-126471, with a filing date of Jun. 28, 2017 in Japan, are incorporated herein by reference.

The invention claimed is:

1. A vehicle control device for a vehicle with a drive source and an automatic transmission including a friction engaging element for transmitting a driving force of the drive source to drive wheels by being engaged by a hydraulic pressure, wherein:
    the vehicle control device is configured to
        perform an abnormality diagnosis of a solenoid valve for adjusting a hydraulic pressure to be supplied to the friction engaging element on the basis of a slip amount of the friction engaging element; and
        prohibit the abnormality diagnosis of the solenoid valve if a hydraulic pressure upstream of the solenoid valve is below a predetermined hydraulic pressure at which the friction engaging element is engaged, the hydraulic pressure upstream of the solenoid being a source hydraulic pressure to be adjusted by the solenoid valve.

2. The vehicle control device according to claim 1, wherein:
    the automatic transmission includes a continuously variable transmission mechanism having:
        a primary pulley and a secondary pulley, groove widths of the primary pulley and the secondary pulley being changed by the hydraulic pressure; and a belt mounted on the primary pulley and the secondary pulley, and the vehicle control device is configured to prohibit the abnormality diagnosis of the solenoid valve if at least one of a hydraulic pressure to be supplied to the primary pulley or a hydraulic pressure to be supplied to the secondary pulley is below the predetermined hydraulic pressure.

3. The vehicle control device according to claim 1, wherein:

the automatic transmission includes a continuously variable transmission mechanism having:

a primary pulley and a secondary pulley, groove widths of the primary pulley and the secondary pulley being changed by the hydraulic pressure; and a belt mounted on the primary pulley and the secondary pulley, and the vehicle control device is configured to prohibit the abnormality diagnosis of the solenoid valve if both a hydraulic pressure to be supplied to the primary pulley and a hydraulic pressure to be supplied to the secondary pulley are below the predetermined hydraulic pressure.

4. The vehicle control device according to claim 1, wherein:

the vehicle control device is configured to prohibit the abnormality diagnosis of the solenoid valve during travel of the vehicle.

5. A vehicle control method for a vehicle with a drive source and an automatic transmission including a friction engaging element for transmitting a driving force of the drive source to drive wheels by being engaged by a hydraulic pressure, comprising:

performing an abnormality diagnosis of a solenoid valve for adjusting a hydraulic pressure to be supplied to the friction engaging element on the basis of a slip amount of the friction engaging element; and prohibiting the abnormality diagnosis of the solenoid valve if a hydraulic pressure upstream of the solenoid valve is below a predetermined hydraulic pressure at which the friction engaging element is engaged, the hydraulic pressure upstream of the solenoid being a source hydraulic pressure to be adjusted by the solenoid valve.

6. A vehicle control device for a vehicle with a drive source and an automatic transmission including a friction engaging element for transmitting a driving force of the drive source to drive wheels by being engaged by a hydraulic pressure, comprising:

diagnosis means for performing an abnormality diagnosis of a solenoid valve for adjusting a hydraulic pressure to be supplied to the friction engaging element on the basis of a slip amount of the friction engaging element; and prohibition means for prohibiting the abnormality diagnosis of the solenoid valve by the diagnosis means if a hydraulic pressure upstream of the solenoid valve is below a predetermined hydraulic pressure at which the friction engaging element is engaged, the hydraulic pressure upstream of the solenoid being a source hydraulic pressure to be adjusted by the solenoid valve.

\* \* \* \* \*